United States Patent [19]

Inoue et al.

[11] Patent Number: 5,563,714

[45] Date of Patent: Oct. 8, 1996

[54] DIGITAL SIGNAL PROCESSING APPARATUS FOR RECORDING AND REPRODUCING TIME-BASE COMPRESSED DIGITAL IMAGE DATA IN AN IMAGE TRANSMISSION SYSTEM

[75] Inventors: Hajime Inoue, Chiba; Yukio Kubota; Keiji Kanota, both of Kanagawa; Akira Shimazu, Tokyo, all of Japan

[73] Assignee: Sony Corporation, Tokyo, Japan

[21] Appl. No.: 421,942

[22] Filed: Apr. 13, 1995

[30] Foreign Application Priority Data

Apr. 21, 1994 [JP] Japan ................................ 6-106133

[51] Int. Cl.$^6$ ............................................. H04N 5/76
[52] U.S. Cl. ........................... 386/66; 360/12; 386/109; 386/125
[58] Field of Search ....................... 360/13, 14.1, 33.1, 360/12; 358/310, 335, 342; 348/10

[56] References Cited

U.S. PATENT DOCUMENTS

4,685,003  8/1987  Westland ........................ 360/14.1
5,438,459  8/1995  Suga et al. ...................... 360/38.1
5,442,390  8/1995  Hooper et al. ................... 348/7
5,452,097  9/1995  Koga et al. ..................... 358/342

Primary Examiner—Thai Q. Tran
Assistant Examiner—Luanne P. Din
Attorney, Agent, or Firm—William S. Frommer; Alvin Sinderbrand

[57] ABSTRACT

Time-based compressed data representing a program is supplied from a local conditional access circuit to two recording signal processing circuits which supply the data to be recorded simultaneously in time-compressed form by a digital VTR and an HDD (hard disc drive). The HDD need only store enough data to allow the digital VTR to record the entire program and to synchronize the output of the VTR with the output of the HDD. Once the program has been recorded on the VTR, it is reproduced therefrom concurrently with the portion of the program reproduced by the HDD and, once synchronization therebetween is reached, the VTR-reproduced data replaces the HDD-reproduced data. The reproduced data is supplied to an MPEG decoder circuit to be output as a reconstructed program for immediate display.

14 Claims, 11 Drawing Sheets

DIGITAL SIGNAL PROCESSING APPARATUS FOR RECORDING AND REPRODUCING TIME-BASE COMPRESSED DIGITAL IMAGE DATA IN AN IMAGE TRANSMISSION SYSTEM

BACKGROUND OF THE INVENTION

The present invention relates to a digital signal processing apparatus in an image transmission system, such as digital CATV or digital satellite broadcasting, in which a time-base compressed television signal is transmitted. The present invention reduces the time between the user transmitting a program request and viewing the requested program.

Previously, only analog audio/video signals were transmitted from a broadcasting station to the public. But in recent years, broadcasting stations have begun to transmit digitized signals in association with the development of digital techniques. These digital techniques compress a video signal transmitted from a broadcasting station so that signals which were conventionally transmitted in approximately ten analog channels are now transmitted in one analog channel. The compressed digital signal can be further time-base compressed before it is transmitted. For example, when a video signal which was compressed at a rate of 1.5 Mbps is transmitted on a transmission path which can transmit actual digital data, excluding an error correcting code and the like, at 24 Mbps, the video signal can be further time-base compressed by a factor of sixteen. Therefore, a program of two hours can be transmitted in seven or eight minutes.

Figure 7:
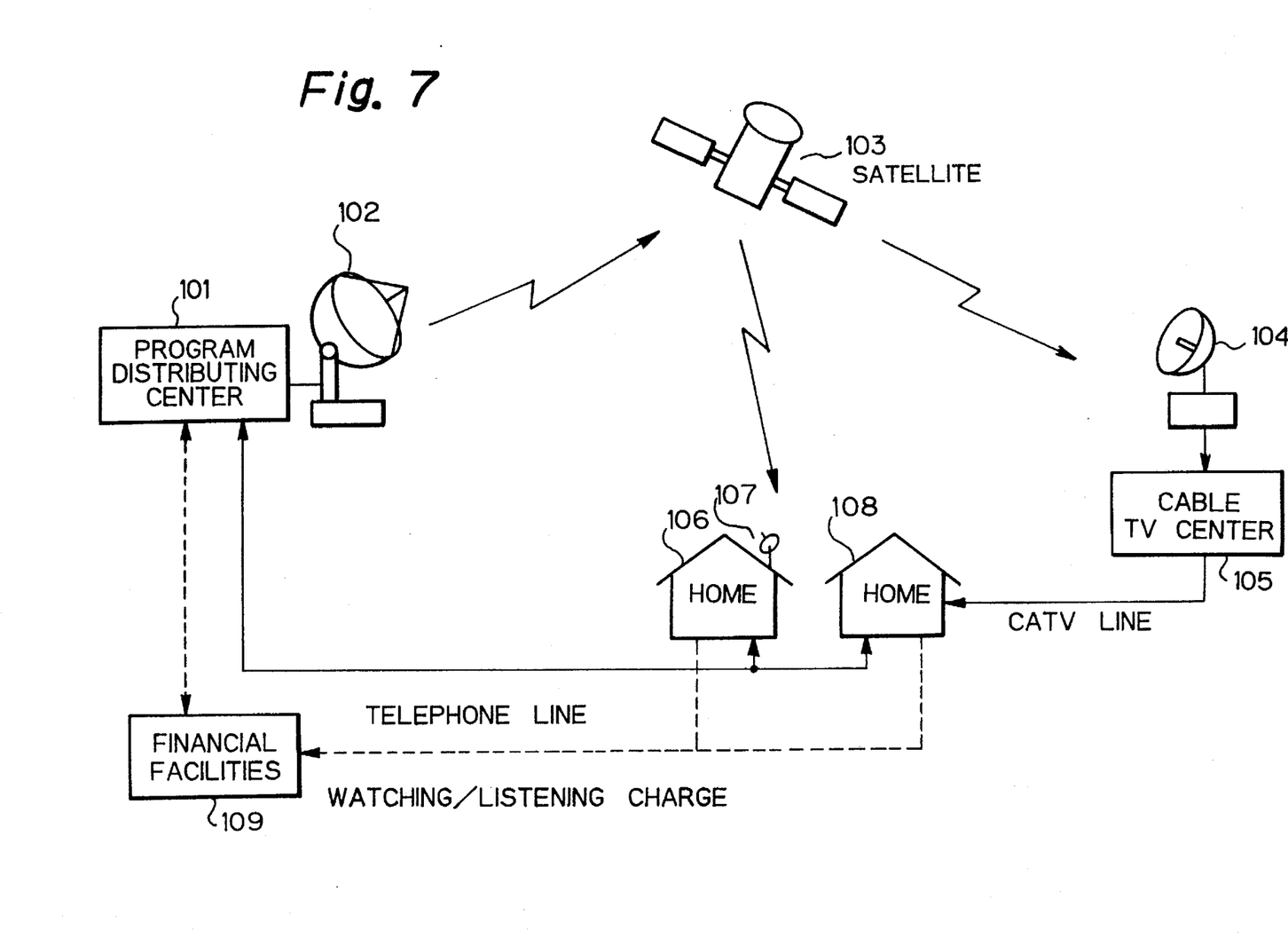
FIG. 7 is a diagram showing an image transmission system that may be used with the present invention to transmit and receive time-base compressed digital image data.
Figures 8, 8A:
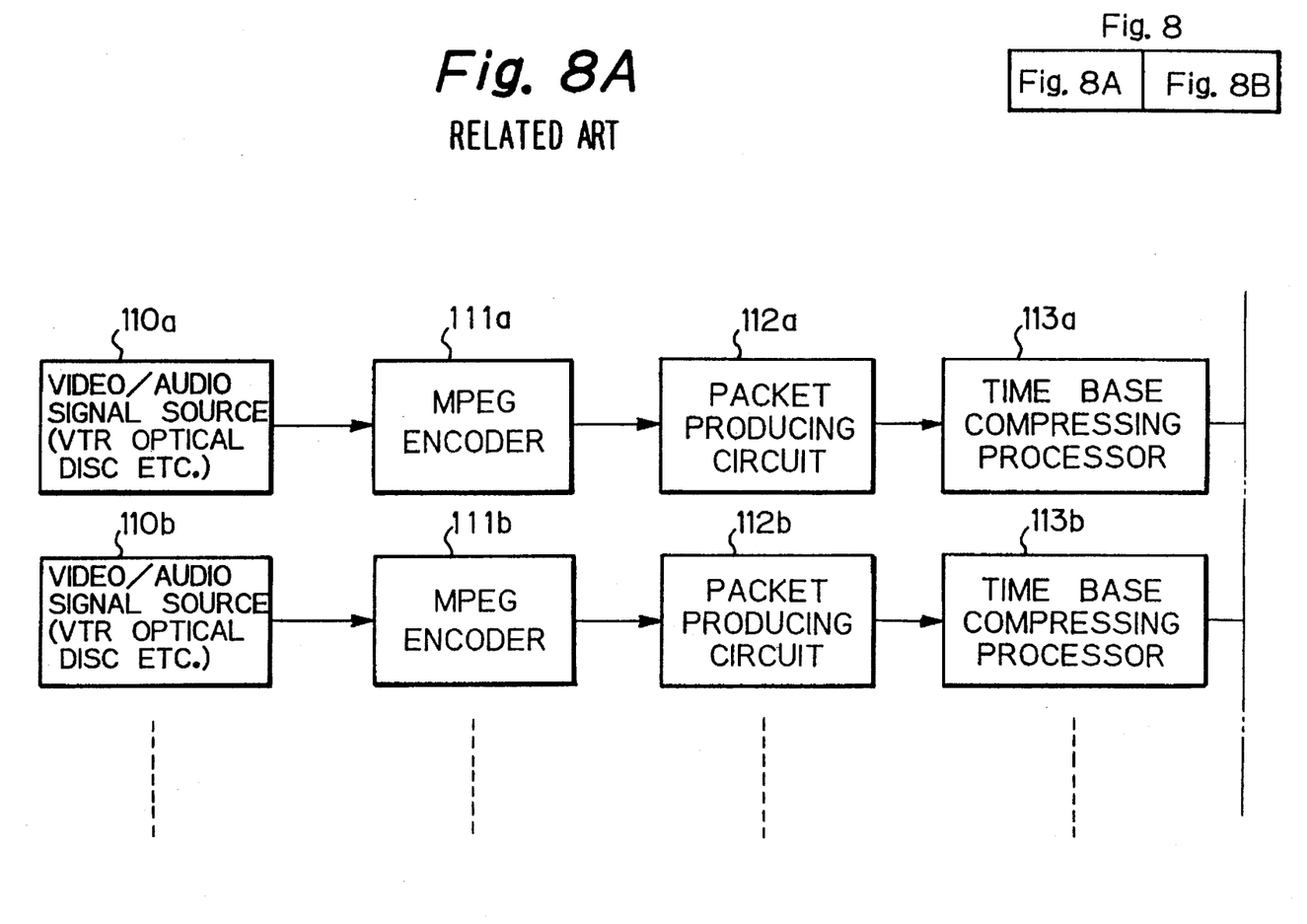
FIGS. 8, 8A, and 8B are block diagrams of a portion of the image transmission system shown in FIG. 7.
Figure 8B:
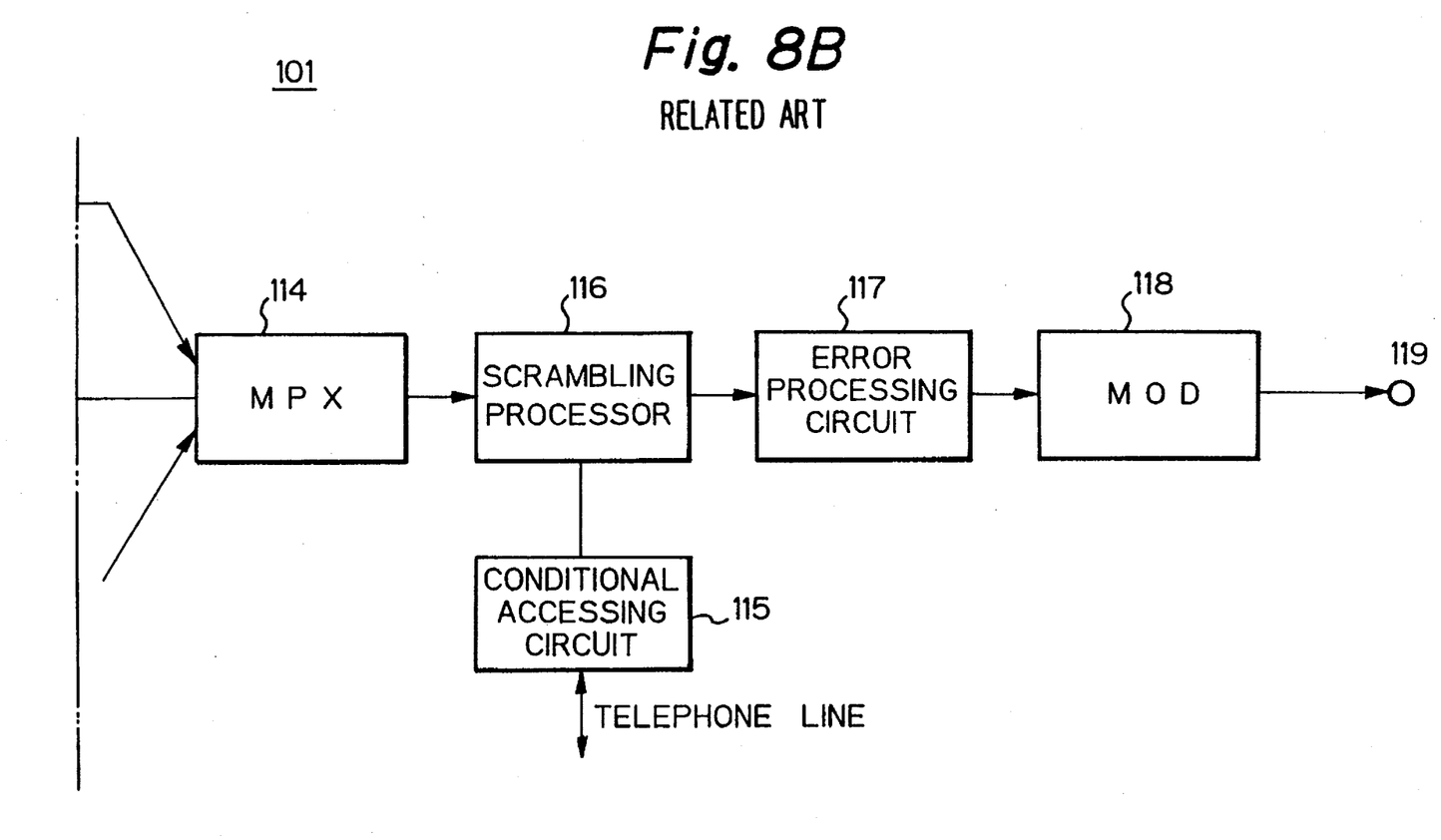

FIGS. 7 and 8 illustrate systems in which the time-base compressed signal is transmitted. In FIG. 7, each home transmits a request for a program to program distributing center 101 over the telephone lines. The time-base compressed digital signal is transmitted to communication satellite 103 through parabolic antenna 102 by the program distributing center. The communication satellite transmits the received digital signal to parabolic antenna 104 of cable TV center 105 and/or parabolic antenna 107 of each home 106. Cable TV center 105 relays the received digital signal to the contracting home 108 via a CATV line.

The user cannot view the program before the signal is processed since the received digital signal has been time-base compressed. The digital signal received by each home 106, 108 is recorded by a recording apparatus such as a digital VTR or the like and, after the recording of the program is complete, the digital signal is reproduced and returned to its original time-base for viewing. Therefore, each home must have a receiver connected to a recording and reproducing apparatus.

Each home, or consumer, pays a charge through financial facilities 109 when a program is requested. Thus, accounting information is stored in an accounting data base (not shown) of program distributing center 101 when the received digital signal data are recorded by the recording and reproducing apparatus in that home.

FIG. 8 illustrates a block diagram of program distributing center 101. An audio/video signal from signal source 110a, such as a VTR, an optical disc, or the like, is compressed by MPEG encoder 111a. The compressed signal is divided into packets by packet producing circuit 112a and is time-base compressed by time-base compression circuit 113a. In FIG. 8, a plurality of channels are processed in this manner, as represented by elements 110b, 111b, 112b and 113b, and one channel is selected by multiplexer 114 for further processing and transmission. The multiplexed signal selected for transmission is enciphered by scramble processor 116 with a scramble key generated by conditional accessing circuit 115. The scramble key can be transmitted to each home over the telephone lines or it can be transmitted with the multiplexed signal. An error correction code is added to the enciphered signal by error processing circuit 117 and the signal is modulated for transmission by modulating circuit 118. The modulated signal is transmitted via output terminal 119.

According to the U.S. patent application Ser. No. 08/253,283 filed on Jun. 12, 1994, by the present applicant, the user must wait at least seven or eight minutes from the transmission of a program request until the user is able to view the program, assuming a program length of two hours and a time-base compression factor of sixteen. The delay is caused because the digital signal is not reproduced until after the entire program has been recorded on the recording and reproducing apparatus at his home.

SUMMARY AND OBJECTS OF THE INVENTION

It is, therefore, an object of the invention to provide a digital signal processing apparatus in an image transmission system which receives an image signal that is time-base compressed from a broadcasting station and reduces the amount of time from the transmission of a request to that broadcasting station until the user is actually able to view the requested program.

The time-base compressed digital signal of a requested program is received at the requestor's site and is continuously recorded to its end by a digital VTR at that site. Simultaneously, the time-base compressed digital signal is recorded by a HDD (hard disk drive) on a hard disk (for example, a magnetic hard disk) at the requestor's site until the disk is full. After the HDD records a predetermined portion of the signal data, the HDD begins reproducing the program. The reproduced digital signal data are output from the HDD and time-base expanded to be displayed on, for example, a monitor as reconstructed image data. When the recording is completed by the digital VTR, the magnetic tape is rewound to a position corresponding to the portion of the program then being reproduced by the HDD. The signals output from the HDD and the digital VTR are synchronized with each other and, without interruption of the program, the source of the reproduced program is changed over from the HDD to the digital VTR. The program is then reproduced to its end by the digital VTR. Thus, while the time-base compressed digital signal is being recorded by the digital VTR, the contents of the program can be viewed by the user because of the recording thereof by the HDD.

In another embodiment of the invention, recording and reproduction of the program by the HDD is carried out simultaneously. The HDD, herein, contains a write-head and a separate read-head to allow for simultaneous recording and reproducing. Therefore, the program can be viewed by the user without any delay.

The digital signal processing apparatus of the present invention can receive the time-base compressed digital image data and simultaneously reproduce it in a short period of time. Therefore, the user can watch the requested program soon after the request is made.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DETAILED DESCRIPTION OF CERTAIN ONES OF THE PREFERRED EMBODIMENTS

Several embodiments of a digital signal processing apparatus according to the invention are described hereinbelow with reference to the drawings.

Figures 1, 1A:
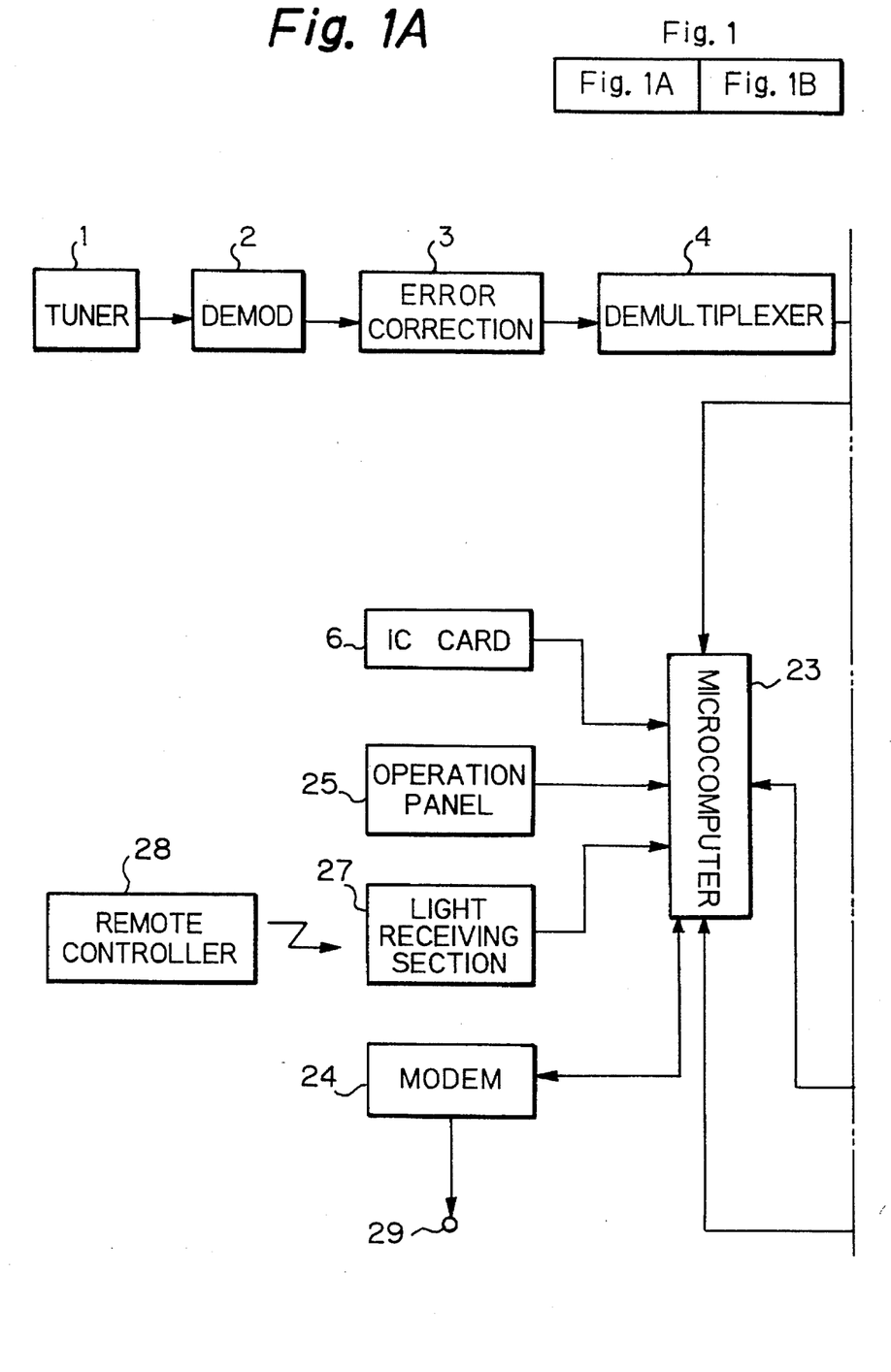
FIGS. 1, 1A, and 1B are block diagrams showing one embodiment of a digital signal processing apparatus according to the invention.
Figure 1B:
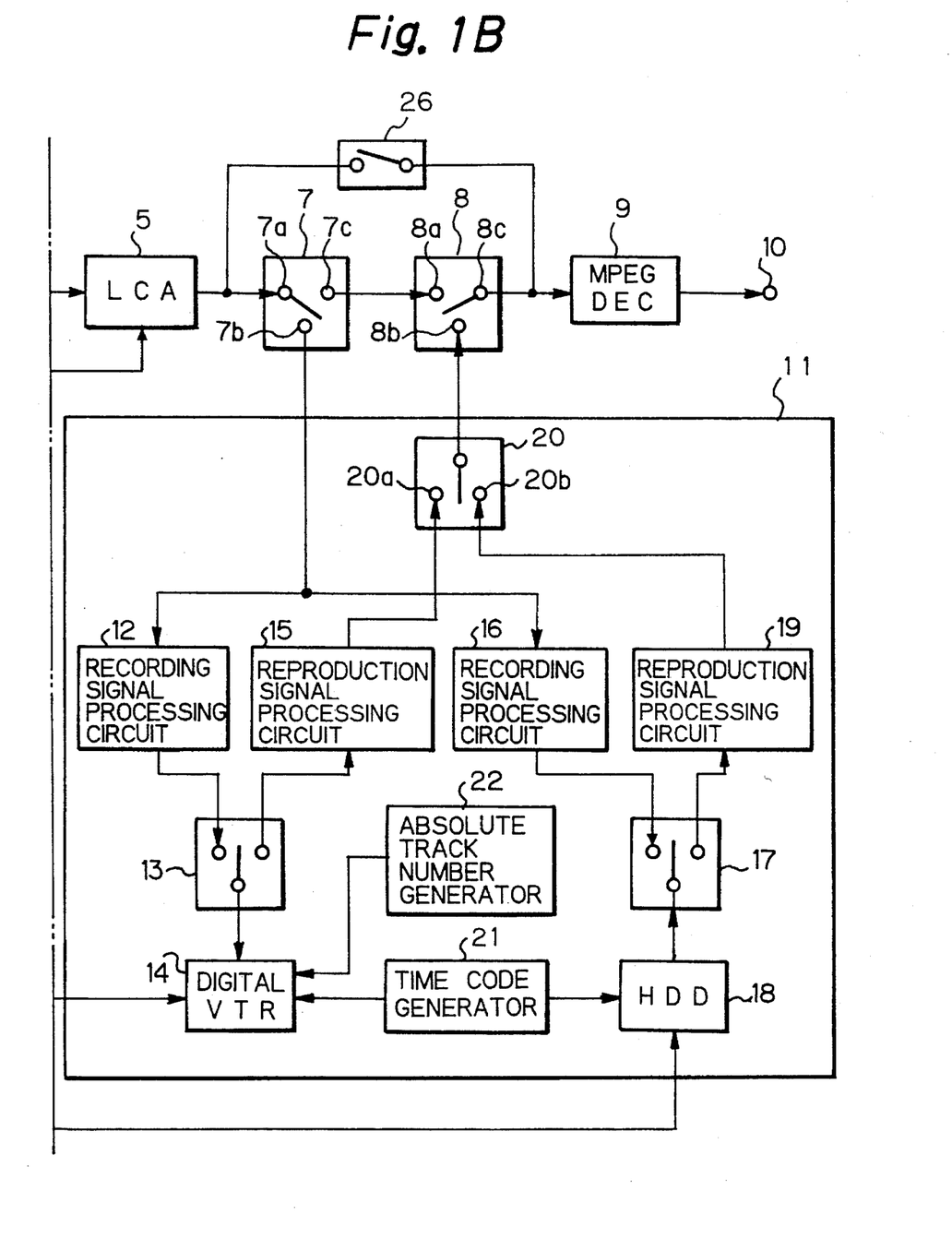

FIG. 1 shows a block diagram of one embodiment of the digital signal processing apparatus of the invention. A digital signal which is encoded according to, for example, MPEG2 (Moving Picture Experts Group 2), time-base compressed and enciphered, and which represents a selected one of a plurality of programs that has been so encoded, is transmitted to tuner circuit 1 at the site of a user (e.g. at the consumer's home) over a desired broadcasting channel.

The signal received by the tuner circuit is demodulated by demodulating circuit 2 and errors which may have occurred during transmission of the signal are corrected by error correction circuit 3. The error corrected signal is supplied to demultiplexer circuit 4, which selects the desired program. The signal is output from the demultiplexer circuit and supplied to local conditional accessing circuit 5. The enciphered signal is deciphered by the local conditional accessing circuit according to the information stored in a decrypting IC card 6. After the enciphered signal is deciphered, microcomputer 23 transmits accounting information to the program distributing center 101 through modem 24 so that the consumer is properly billed for these services.

The deciphered signal is supplied from the local conditional accessing circuit to input 7a of switching circuit 7. An output 7b of switching circuit 7 is connected to recording and reproducing section 11 and then output 7c of the switching circuit is connected to an input 8a of switching circuit 8. A signal from recording and reproducing section 11 is supplied to another input 8b of switching circuit 8 whose output 8c is connected to MPEG decoder circuit 9. Switching circuit 26 is connected between the local conditional accessing circuit and the MPEG decoder circuit and selectively by-passes switching circuits 7 and 8. A signal which is output from the MPEG decoder circuit is sent to a monitor or the like through output terminal 10.

The recording and reproducing section 11 includes digital VTR 14 and HDD (hard disk drive) 18. The deciphered signal supplied to output 7b of switching circuit 7 from local conditional accessing circuit 5 is supplied in common to recording signal processing circuits 12 and 16. Preferably, recording signal processing circuit 12 includes a buffer, an error correction code encoding circuit, a frame forming circuit, a channel modulating circuit, and the like (not shown). The output of recording signal processing circuit 12 is supplied to digital VTR 14 through switching circuit 13 and is recorded on a magnetic tape. In addition, time codes are generated by time code generating circuit 21 and absolute track numbers are generated by absolute track number generating circuit 22, and such time codes and track numbers are recorded in, for example, a subcode area on the magnetic tape.

When the digital signal recorded on the magnetic tape subsequently is reproduced by the digital VTR, the reproduced signal is supplied to reproduction signal processing circuit 15 through switching circuit 13 and is supplied therefrom to input 8b of switching circuit 8 through switching circuit 20. Reproduction signal processing circuit 15 includes a channel demodulating circuit, an error correction code decoding circuit, a time-base conversion circuit, a deframing circuit, and the like (not shown).

The signal supplied to recording signal processing circuit 16 from local conditional accessing circuit 5 is coupled to HDD 18 through switching circuit 17 and is recorded on the hard magnetic disc thereat. Preferably, recording signal processing circuit 16 includes a buffer, an error correction code encoding circuit, a frame forming circuit, a channel modulating circuit, and the like (not shown), similar to that of recording signal processing circuit 12. The time code data generated by time code generating circuit 21 is also recorded on the hard disc.

The deciphering digital signal subsequently reproduced from the hard disc is supplied from HDD 18 to reproduction signal processing circuit 19 through switching circuit 17. The reproduction signal processing circuit 19 preferably includes a channel demodulating circuit, an error correction code decoding circuit, a deframing circuit, and the like (not shown), similar to that of processing circuit 15. An output from reproduction signal processing circuit 19 is supplied to input 8b of switching circuit 8 through switching circuit 20.

The switching operation of each of the switching circuits 7, 8, 13, 17, 20, and 26 is controlled by microcomputer 23 and for simplification, switching control leads are not shown. The IC card 6, operation panel 25, modem 24 and remote control apparatus including remote controller light receiving section 27 and remote control transmitter 28 are connected to microcomputer 23 which operates to control the driving systems of digital VTR 14 and HDD 18.

In FIG. 1, rather than supply the signal output from local conditional accessing circuit 5 to recording and reproducing section 11, the signal output from the demultiplexer circuit 4 can be supplied to the recording and reproducing section. However, it is preferred to record the deciphered digital signal from circuit 5 because this permits a search to be performed with visible images derived from digital signal data that have been deciphered in the local conditional accessing circuit and then recorded by the recording and reproducing section. If the digital signal is not deciphered prior to recording, unintelligible images will be displayed during subsequent reproduction and searching.

Figure 2:
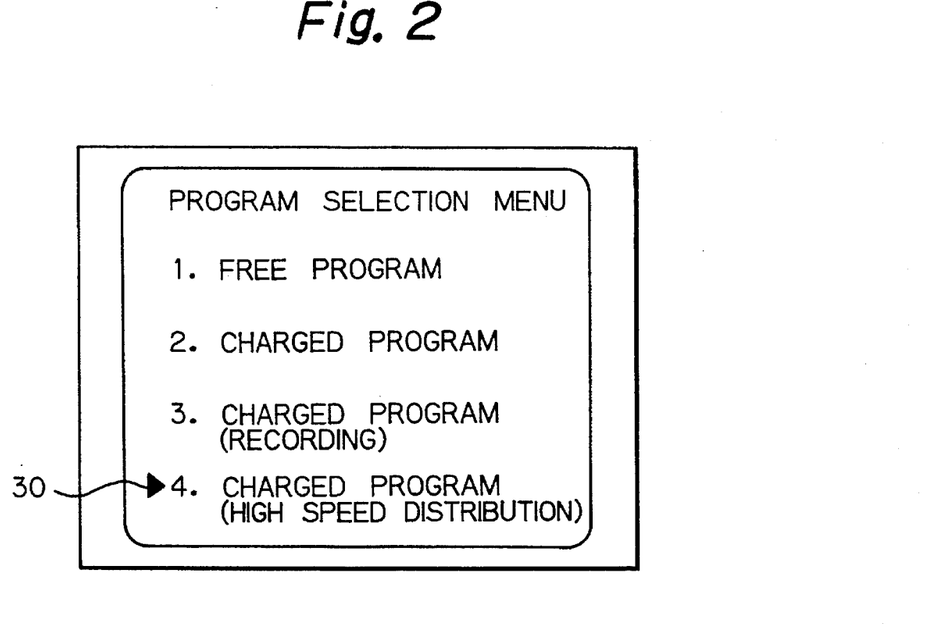
FIG. 2 is a diagram showing an example of a program selection screen according to the invention.

The operation of the apparatus of FIG. 1 will now be described. First, the user selects a program by using operation panel 25 and/or remote control transmitter 28. As shown by the display of FIG. 2, the user moves cursor 30 by operating panel 25 or transmitter 28 to select a program from the selection panel displayed on a monitor or television. If the user selects "1. free program" or "2. charged program (viewing)", the selected program can be viewed directly by supplying the MPEG encoded signal as it is received to MPEG decoder 9 because the signal is not recorded by the digital VTR 14 or HDD 18 and, time-base compressed. Switching circuits 7 and 8 are switched to supply the deciphered signal from local conditional accessing circuit 5 to MPEG decoding circuit 9 whereat it is decoded and output.

When "2. charged program (viewing)" is selected, the data is not recorded by the recording and reproducing section 11. Since a fee is charged for the broadcast, accounting information is transmitted to program distributing center 101 through modem 24 when the program is received by the user. The viewing charge is made only once per program and so it is relatively inexpensive.

When the user selects "3. charged program (recording)" from the program selection panel, the received program is recorded by recording and reproducing section 11. The user can choose to view this program now and/or at a later time. The received digital data are supplied by switching circuit 7 to digital VTR 14 to record the program on magnetic tape. In addition, switching circuit 26 is turned on to provide a bypass so that the program can be viewed while it is being recorded by the digital VTR. No time-base decompression is required in this instance because the received signal, although encoded according to the MPEG2 format, is not time-base compressed at this time. The program is recorded by digital VTR 14 operable in a normal recording mode and can be viewed again at a later time. As before, accounting information is transmitted to program distributing center 101 through modem 24 when the program is received by the user. Typically the charge is higher in the instant case compared to the charge for "2. charged program (viewing)" because here the program is being recorded and can be viewed multiple times. If any option other than "3. charged program (recording)" is selected, switching circuit 26 is turned off, i.e., opened to prevent the received program from being viewed while it is being received.

When the user selects "4. charged program (high speed distribution)" from the program selection panel, the program cannot be viewed simultaneously with its reception because the signal is transmitted in time-base compressed form. Switching circuit 7 is switched to couple the received program to recording and reproducing section 11 as described below.

Figure 3:
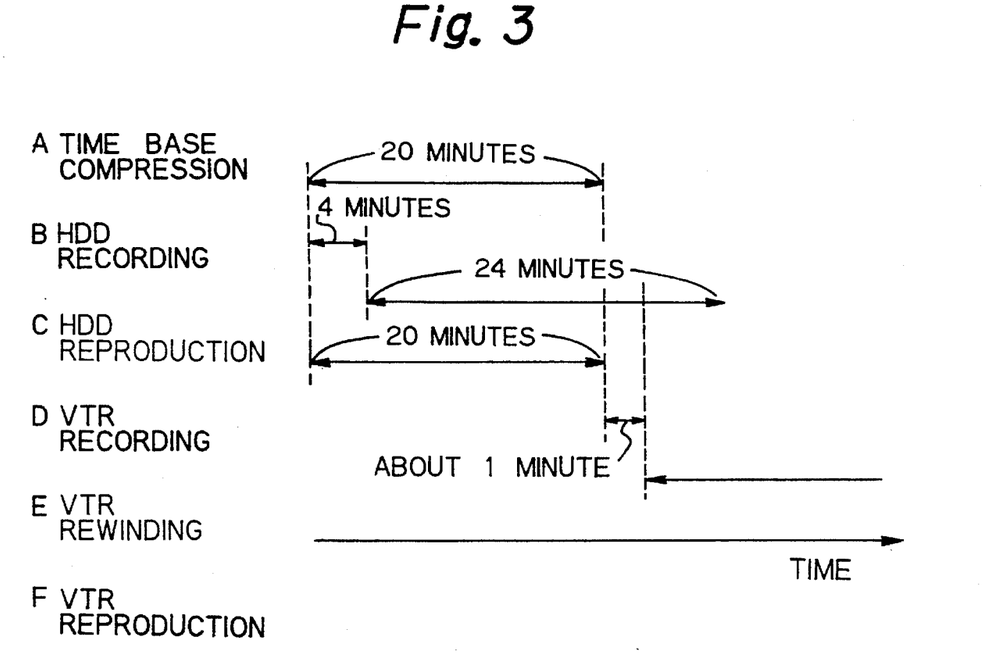
FIG. 3 is a timing chart showing the recording and reproducing operations of the embodiment shown in FIG. 1.

FIG. 3 is a timing chart showing an example of the operation of recording and reproducing section 11 when a program of two hours, which has been time-base compressed by a factor of 6, for example, is received. Section A shows the period (20 minutes) during which the time-base compressed program is received by the recording and reproducing section. Section B shows the period (about 4 minutes) during which a portion of the received time-base compressed program is recorded by HDD 18. Section C shows the period (about 24 minutes) representing the length of the program reproduced by the HDD in its original (i.e. de-compressed) time-base. Section D shows the period (20 minutes) during which the entire time-base compressed program is recorded by digital VTR 14. Section E shows a period (about one to two minutes) during which the digital VTR rewinds the magnetic tape and searches for the portion of the program recorded thereon corresponding to the image then being reproduced by the HDD. Section F shows the period during which the digital VTR reproduces the rest of the program recorded on the magnetic tape, the reproduced program having been de-compressed.

As will be understood from Sections A, B, and D of FIG. 3, when the time-base compressed program first is received, and for a period of time thereafter, digital VTR 14 and HDD 18 record the program simultaneously. In this instance, the recording rates of the digital VTR and the HDD are the same. The HDD records the program until the hard disc is full (about 4 minutes). Reproduction of the program stored on the hard disc is started, as shown in Section C, once the hard disc is full. The accessing speed of the hard disc is faster than that of the magnetic tape, therefore, the program can be viewed almost immediately after recording on the hard disc is complete. Preferably, the speed of reproducing the program from the hard disc is slower than the recording speed and, thus, the signals are returned to their original time-base as they are read from the hard disc. The reproduced signal is supplied to MPEG decoder circuit 9 through switching circuits 20 and 8 and the reconstructed image is output via output terminal 10.

While the portion of the program stored by HDD 18 is being reproduced, digital VTR 14 finishes recording the entire program on the magnetic tape. After the program has been recorded by the digital VTR, microcomputer 23 recognizes a time code in the portion of the program then being reproduced by the HDD and converts it to the corresponding track number recorded on the magnetic tape. The magnetic tape then is rewound at high speed and microcomputer 23 searches the magnetic tape for that track number. The search of the magnetic tape by track number is performed at a speed that is about 200 times the normal tape speed. Therefore, for a recording of 20 minutes, the corresponding track number can be located in about six seconds. When the correct track is found, the data recorded on the magnetic tape is reproduced and the signal output from the magnetic tape is synchronized with the program signal then being reproduced from the hard disc. The digital VTR can rewind the magnetic tape and synchronize its reproduced output with the output from the HDD in approximately one or two minutes.

When the program being reproduced by digital VTR 14 is fully synchronized with that portion of the program then being reproduced by HDD 18, switching circuit 20 is switched from input 20b to input 20a, whereby, the program reproduced from the digital VTR is output in place of the signal from the HDD. Thus, the user can continue to view the program to its end without interruption.

Sufficient program data should be stored on the hard disc by HDD 18 to allow enough time for digital VTR 14 to record the entire program (20 minutes), to rewind the magnetic tape and to synchronize the signals being reproduced from the hard disc and the magnetic tape (one to two minutes). Thus, the hard disc should be able to store at least 22 (de-compressed) minutes of program data for a 2 hour program.

From the foregoing description, it is appreciated that it is unnecessary for the user to wait until the entire program is recorded by the digital VTR (approximately 22 minutes) before viewing that program. The user need only wait while a portion of the program is recorded on the hard disc before that program can be viewed (approximately 4 minutes). Therefore, the period of time from requesting a program to viewing that program is markedly reduced.

Figures 4, 4A:
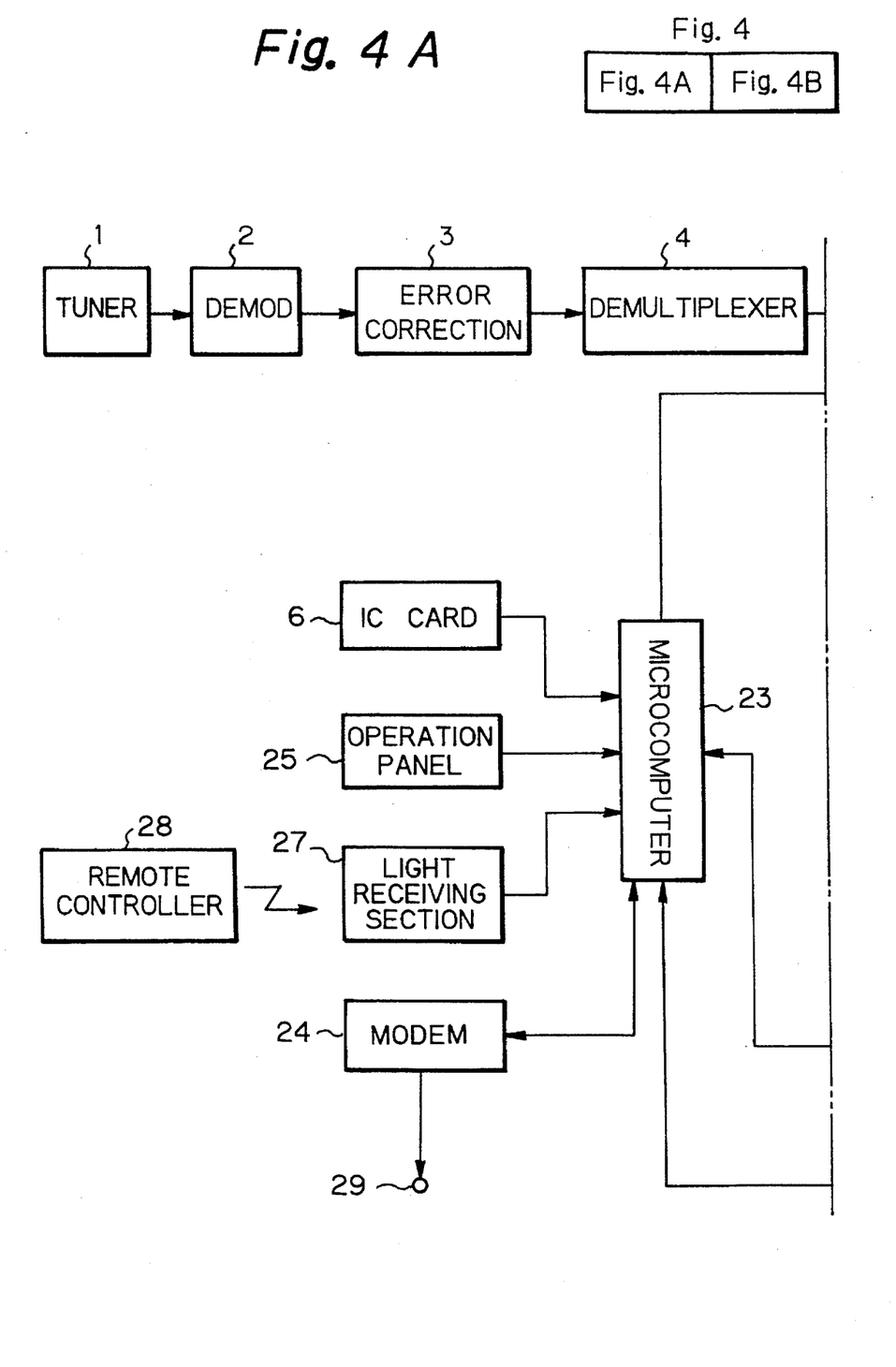
FIGS. 4, 4A, and 4B are block diagrams showing another embodiment of the digital signal processing apparatus according to the invention.
Figure 4B:
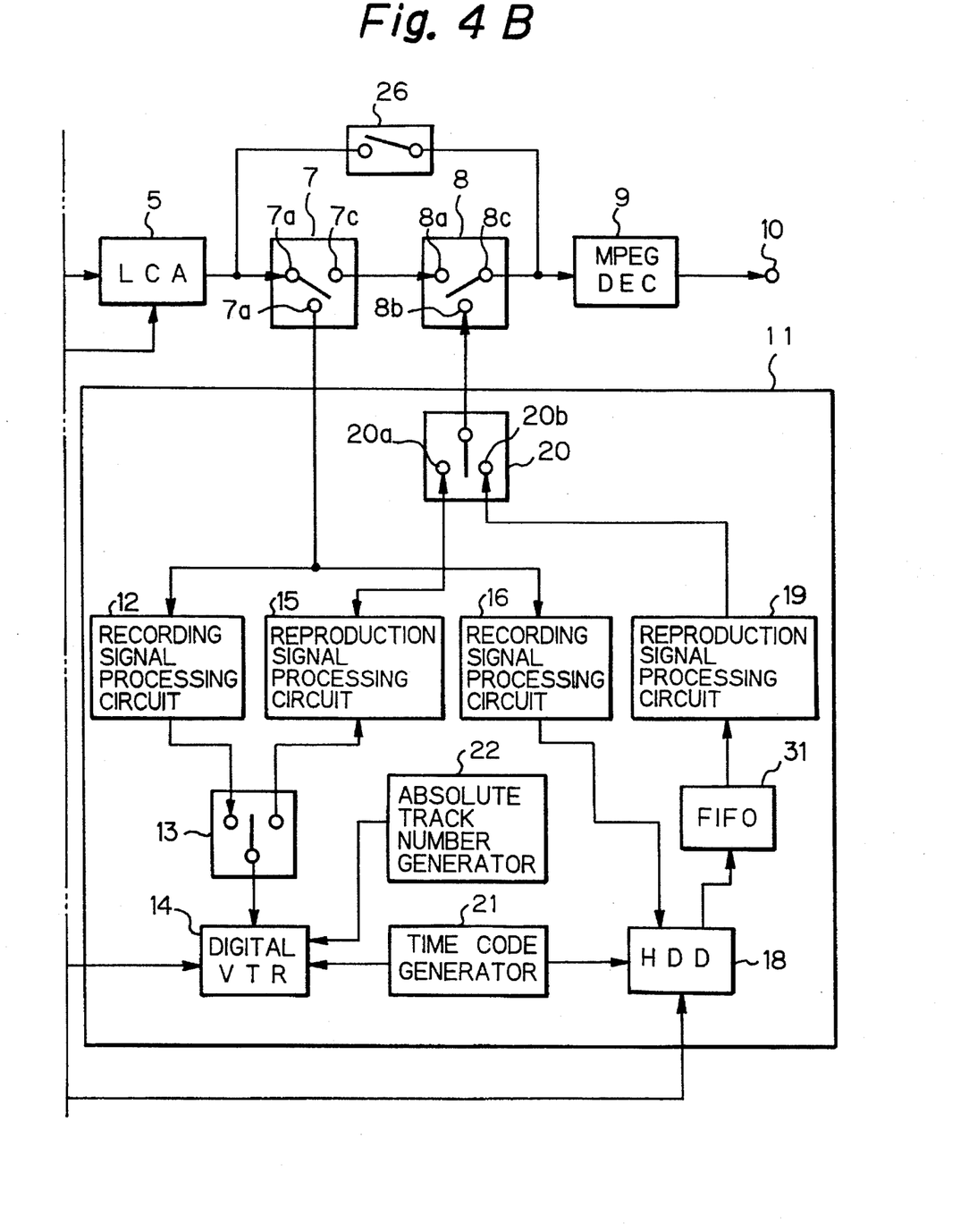

Another embodiment of the invention will now be described with reference to FIGS. 4 and 5. FIG. 4 shows a block diagram of the digital processing apparatus according to the second embodiment. A detailed description of the blocks with like reference numerals to those of FIG. 1 would be redundant and, therefore, has been omitted. In this embodiment, a separate write-head (not shown) and a separate, independent read-head (not shown) are provided for HDD 18. The signal output from recording signal processing circuit 16 is supplied to the write-head and is recorded thereby on the hard disc. The read-head, which is operable independent of the write-head, reproduces the program from the hard disc even while it is being recorded by the write-head. The signal reproduced by the read-head is input to FIFO (First In First Out) memory 31 and then output via reproduction signal processing circuit 19, switch 20 and switch 8 to MPEG decoder 9. The program is returned to its original time-base when it is read from the FIFO memory by using a properly set read clock (not shown). Though the signal can be returned to its original time-base when it is read from FIFO memory 31, it is also possible to reproduce the signal in its original time-base by reading data from the disk with time-base expansion circuitry.

Figure 5:
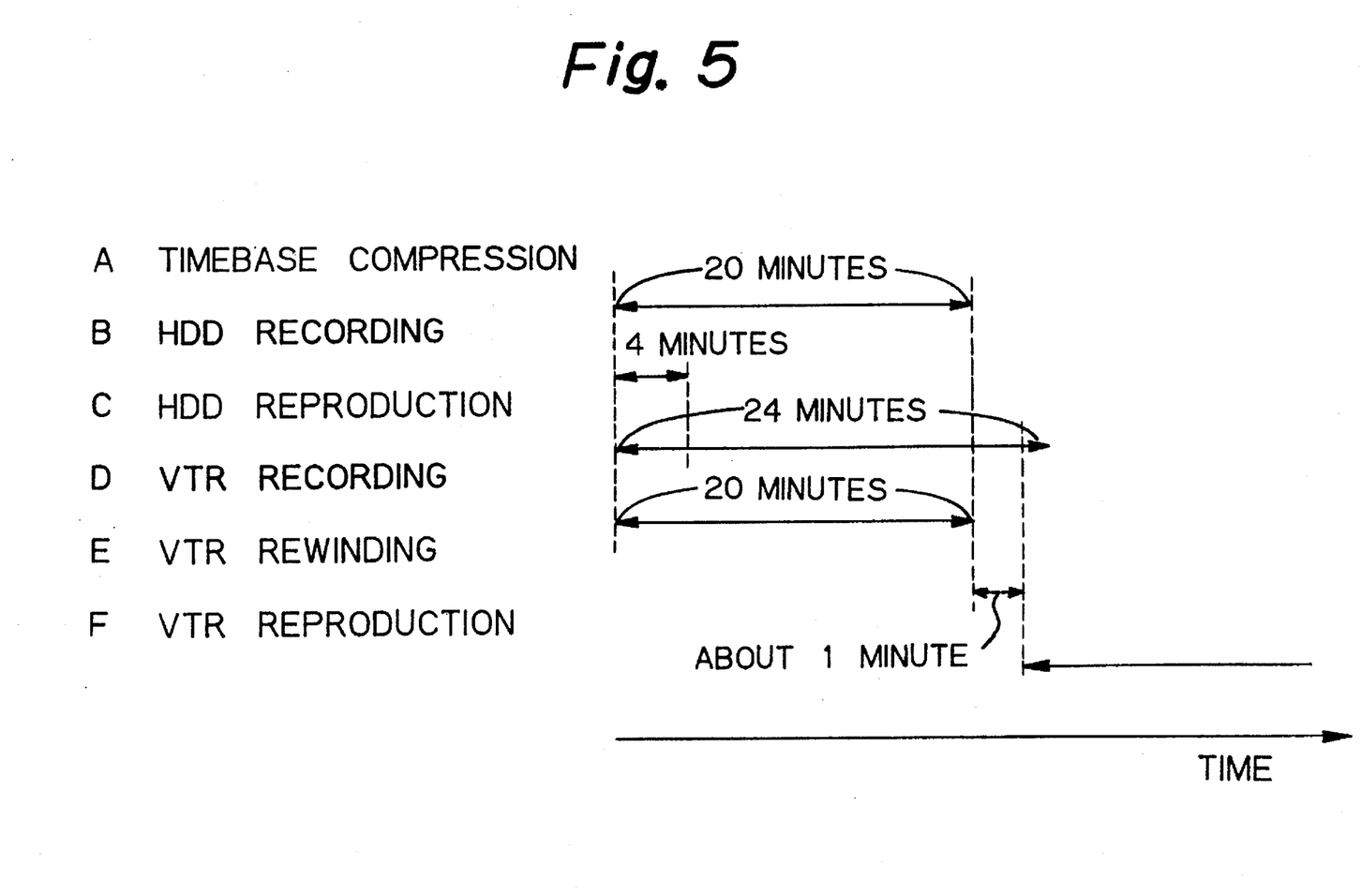
FIG. 5 is a timing chart showing the recording and reproducing operations of the embodiment shown in FIG. 4.

FIG. 5 is a timing chart showing an example of the operation of recording and reproducing section 11, according to the embodiment of FIG. 4 when a program of two hours, which has been time base compressed by a factor of six, is received. Section A shows the period (20 minutes) during which the time-base compressed program is received by the recording and reproducing apparatus. Section B shows the period (about 4 minutes) during which HDD 18 records the time-base compressed program on a hard disc. Section C shows the period (about 24 minutes) representing the length of the program reproduced by the HDD in its original (de-compressed) time-base. Section D shows the period (20 minutes) during which digital VTR 14 records the entire time-base compressed program. Section E shows the period (about one or two minutes) during which the digital VTR rewinds the magnetic tape and searches for the track number corresponding to the time code of the program then being reproduced from the hard disc, as described with respect to the embodiment of FIG. 1. Section F shows the period during which the digital VTR reproduces the rest of the program (in de-compressed form) from the magnetic tape.

The embodiment of FIG. 4, as will be understood from Sections A, B, C, and D, differs from the embodiment of FIG. 1 in that HDD 18 reproduces the program as it is received and recorded by the HDD. That is, HDD 18 undergoes simultaneous recording and reproduction via its separate write- and read-heads. As before, the recording rates of the digital VTR and the HDD are the same and the HDD records the program until the hard disc is full (or at least until a sufficient length of program data is recorded). The data recorded on the hard disc represents 24 minutes of program time once the signal is de-compressed and returned to its original time-base.

While a portion of the program is being reproduced by HDD 18, digital VTR 14 finishes recording the entire program on the magnetic tape, whereafter the recorded program is searched and reproduced in synchronism with the portion of the program then being reproduced by the HDD in a manner similar to that described above in conjunction with FIG. 1. After the programs output by the VTR and HDD are synchronized with each other, switching circuit 20 is switched from input 20b to input 20a to output the remainder of the program from the digital VTR. Consequently, the user may view the program without interruption.

HDD 18 should store a sufficient amount of the program on the hard disc to allow digital VTR 14 to record the program in its entirety (20 minutes), to rewind the recorded magnetic tape and to synchronize its output signal with that portion of the program then being reproduced from the hard disc (one to two minutes). Therefore, the hard disc should be able to record at least 22 minutes of program data for a program of two hours.

According to the embodiment of FIG. 4, HDD 18 executes the recording and reproducing operations simultaneously. Therefore, the user may view the selected program without even waiting 4 minutes, as in the first-described embodiment of FIG. 1.

A further embodiment of the invention will now be described with reference to the block diagram of FIG. 6. HDD 18 and its related circuitry are removed from recording and reproducing section 11 and are disposed of in a separate recording and reproducing section 48. Recording and reproducing section 48 contains recording signal processing circuit 16, reproduction signal processing circuit 19, switching circuit 17, HDD 18, micro-controller 44 and their related circuitry.

Microcomputer 23, discussed above in conjunction with FIG. 1, here is replaced by a micro-controller 47 and by micro-controller 44. Micro-controller 47 interacts with same circuitry as microcomputer 23 and also transmits control signals to the absolute track number generator 22, time code generator 21 and micro-controller 44. Control signals, time code signals and absolute track number signals are coupled to micro-controller 44 from micro-controller 47 via ports 45 and 46.

Time-base compressed digital signals are input to recording signal processing circuit 16 of recording and reproducing apparatus 48 from switching circuit 7 via ports 41 and 43. Signals reproduced by HDD 18 are coupled from reproduction signal processing circuit 19 via ports 42 and 40 to switching circuit 20.

Figures 6, 6A:
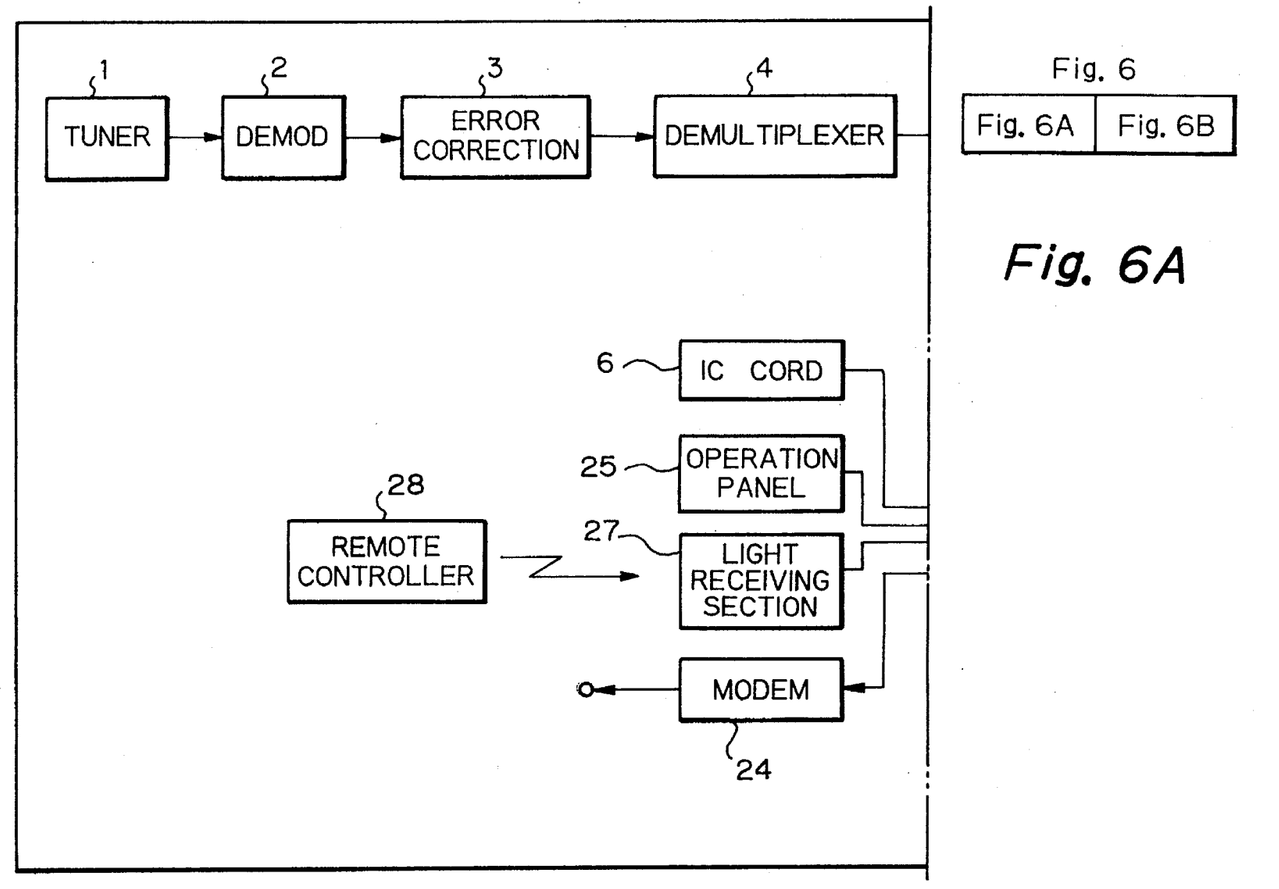
FIGS. 6, 6A, and 6B are block diagrams showing a further embodiment of the digital signal processing apparatus according to the invention.
Figure 6B:
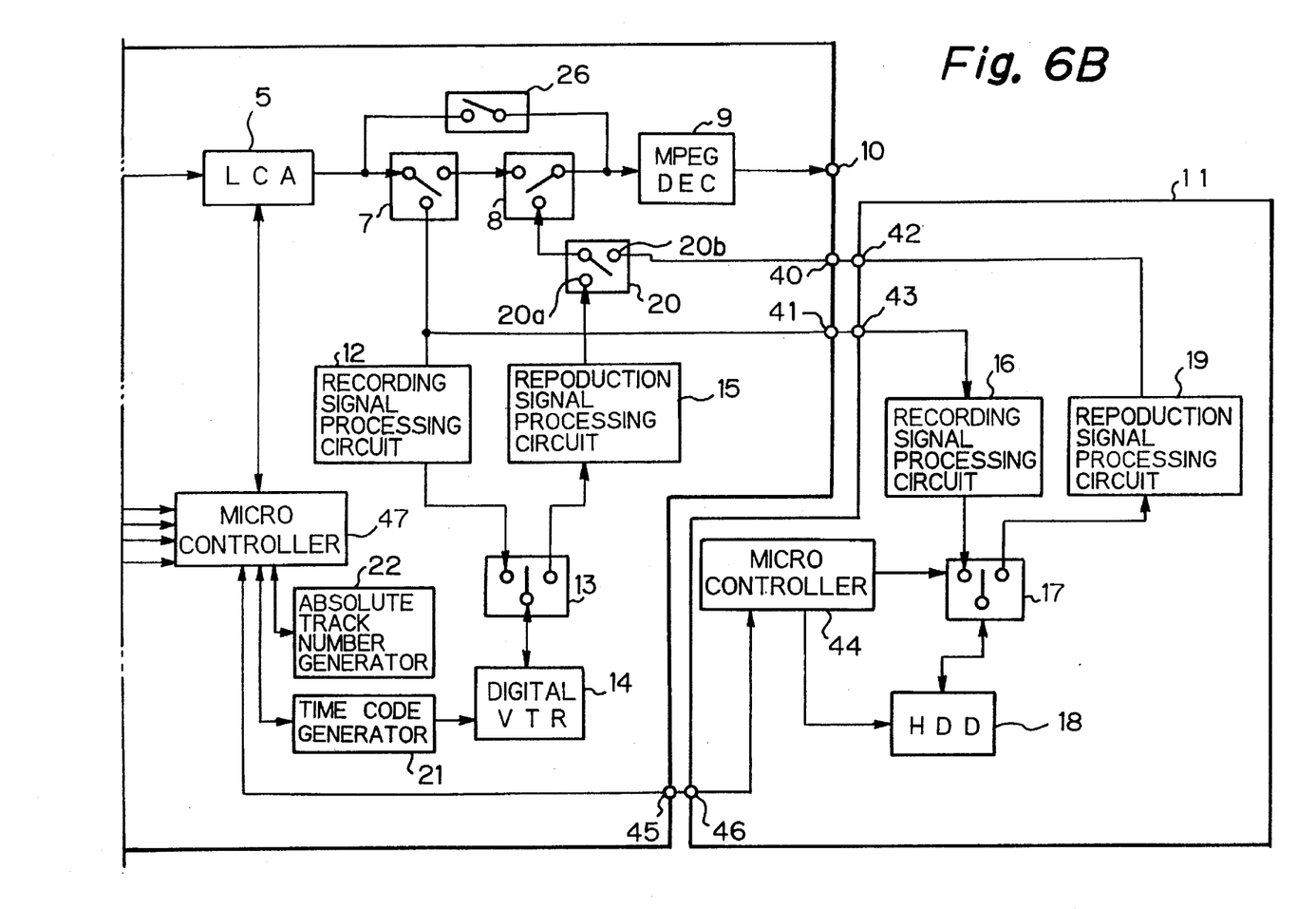

The embodiment of the present invention shown in FIG. 6 operates in the same manner described above with respect to either of the embodiments shown in FIGS. 1 and 4. It should be noted that FIFO memory 31 of FIG. 4 can also be added to recording and reproducing section 48 in FIG. 6.

Although the operation of the present invention records the program on a hard disc, HDD 18 can also record the signal on other recordable media, such as an optical disc, a magneto-optic disc, a semiconductor memory, or the like.

In the above embodiments, although time codes are used to synchronize the programs reproduced from digital VTR 14 and HDD 18, it is also contemplated that addresses of the hard disc and the absolute track numbers or time codes of the magnetic tape can be used for synchronization.

Further, the embodiment of FIG. 4 is not limited to using a separate write-head and a separate-read head in HDD 18. The recording and reproducing operations of the HDD can be time-divisionally processed so that only one recording and reproducing head is needed. FIFO memory 31 is then used as a buffer to temporarily store the respective input and output signals so that no data is lost during the operation of the recording followed by the operation of the reproducing section.

Having described the preferred embodiments of the invention with reference to the accompanying drawings, it is to be understood that the invention is not limited to these precise embodiments and that various changes and modifications could be effected therein by one skilled in the art without departing from the spirit or scope of the invention.

We claim:

1. A digital signal processing apparatus for recording and reproducing time-base compressed digital image data in an image transmission system, comprising:

receiving means for receiving the digital image data;

first store means for storing said digital image data in a time-base compressed form;

first read means for reading the stored digital image data from said first store means and outputting the read digital image data in a time-base expanded form once said storing of said digital image data by said first store means is complete;

second store means for storing said digital image data in a time-base compressed form for a predetermined short period of time, beginning simultaneously with the storing operation of said first store means;

second read means for reading the stored digital image data from said second store means and outputting the read digital image data in a time-base expanded form during the storing period of said first store means; and control means for matching a read out point of said first store means with a read point of said second store means after said completion of said storing operation of said first store means and for outputting said data read from said first store means in place of said data read from said second store means once said control means matches the respective read out points.

2. A digital signal processing apparatus according to claim 1, further comprising:

address generating means for generating address information, wherein said first and second store means store said time-base compressed digital image data with said address information, and said control means matches said read out point of said first and said second store means by comparing the respective address information.

3. A digital signal processing apparatus according to claim 2, wherein said address information includes a time code.

4. A digital signal processing apparatus according to claim 1, further comprising:

input means for inputting a program request, wherein said digital image data represents said program; and communication means for communicating said program request to a program distributing center; and, wherein said receiving means begins receiving said digital image data from said program distributing center after said program request has been communicated.

5. A digital signal processing apparatus according to claim 1, wherein said second store means is disposed separate from said digital signal processing apparatus.

6. A digital signal processing apparatus according to claim 1, wherein said first store means stores said time-base compressed digital image data on a magnetic tape.

7. A digital signal processing apparatus according to claim 1, wherein said second store means stores said time-base compressed digital image data on a re-writable disk.

8. A digital signal processing apparatus for recording and reproducing time-base compressed digital image data in an image transmission system, comprising:

receiving means for receiving said digital image data;

first store means for storing said digital image data in a time-base compressed form;

first read means for reading the stored digital image data from said first store means and outputting the read digital image data in a time-base expanded form once said storing of said digital image data by said first store means is complete;

second store means for storing said digital image data in a time-base compressed form for a predetermined short period of time, beginning simultaneously with the storing operation of said first store means;

second read means for reading the stored digital image data from said second store means and outputting the read digital image data in a time-base expanded form after a predetermined portion of said digital image data has been stored by said second store means; and control means for matching a read out point of said first store means with a read point of said second store means after the completion of the storing operation of said first store means and for outputting said data read from said first store means in place of said data read from said second store means once said control means matches the respective read out points.

9. A method for recording and reproducing time-base compressed digital image data in an image transmission system, comprising the steps of:

receiving the digital image data;

storing said digital image data in a time-base compressed form in a first storage means;

reading the stored digital image data from said first storage means and outputting the read digital image data in a time-base expanded form once said storing of said digital image data in said first storage means is complete;

storing said digital image data in a time-base compressed form for a predetermined short period of time in a second storage means, beginning simultaneously with the storing of said digital data in the first storage means;

reading the stored digital image data from said second storage means and outputting the read digital image data in a time-base expanded form during the storing of said digital image data in the first storage means; and matching a point read from the first storage means with a point read from the second storage means after the completion of the storing in the first storage means and outputting said data read from the first storage means in place of said data read from the second storage means once the respective points are matched.

10. A method according to claim 9, further comprising the steps of: generating address information; storing the address information with said digital image data in both said first and second storage means; and comparing the address information from the point read from the first to the address information from the point read from the second storage means.

11. A method according to claim 10, wherein said address information includes a time code.

12. A method according to claim 9, further comprising the steps of: inputting a program request, said digital image data representing the requested program; communicating said program request to a program distributing center; and receiving said digital image data from said program distributing center after said program request has been communicated.

13. A method according to claim 9, wherein the first storage means is a magnetic tape.

14. A method according to claim 9, wherein the second storage means is a re-writable disk.

* * * * *